(12) United States Patent
Hirose

(10) Patent No.: US 8,513,934 B2
(45) Date of Patent: Aug. 20, 2013

(54) SWITCHING DEVICE COMPENSATION CIRCUIT

(75) Inventor: Tatsuya Hirose, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 233 days.

(21) Appl. No.: 13/089,920

(22) Filed: Apr. 19, 2011

(65) Prior Publication Data

US 2012/0049827 A1 Mar. 1, 2012

(30) Foreign Application Priority Data

Aug. 30, 2010 (JP) ................................ 2010-192483

(51) Int. Cl.
*G05F 1/44* (2006.01)

(52) U.S. Cl.
USPC ........................................................ 323/284

(58) Field of Classification Search
USPC .................. 323/265, 282, 284, 285, 299, 351
See application file for complete search history.

(56) References Cited

U.S. PATENT DOCUMENTS

| | | | |
|---|---|---|---|
| 5,481,178 A * | 1/1996 | Wilcox et al. ................. | 323/287 |
| 6,066,943 A * | 5/2000 | Hastings et al. .............. | 323/285 |
| 6,127,815 A * | 10/2000 | Wilcox ......................... | 323/282 |
| 6,366,070 B1 * | 4/2002 | Cooke et al. .................. | 323/284 |
| 7,193,401 B1 * | 3/2007 | Hasegawa ..................... | 323/283 |
| 7,250,746 B2 * | 7/2007 | Oswald et al. ................ | 323/284 |
| 7,321,222 B2 | 1/2008 | Hojo | |
| 7,541,795 B1 * | 6/2009 | Smith et al. ................... | 323/285 |
| 7,576,531 B2 * | 8/2009 | Nakabayashi ................ | 323/285 |
| 7,737,668 B2 * | 6/2010 | Oswald et al. ................ | 323/259 |
| 7,750,615 B2 * | 7/2010 | Jung et al. .................... | 323/282 |
| 8,217,637 B2 * | 7/2012 | Tsui et al. ..................... | 323/282 |
| 2007/0170904 A1 | 7/2007 | Hojo | |

FOREIGN PATENT DOCUMENTS

| EP | 1 715 569 A1 | 10/2006 |
|---|---|---|
| WO | WO 2005/078910 A1 | 8/2005 |

* cited by examiner

*Primary Examiner* — Adolf Berhane
(74) *Attorney, Agent, or Firm* — Arent Fox LLP

(57) ABSTRACT

A switching device compensation circuit performs switching control by applying a control pulse to a control terminal of a switching device. The switching device compensation circuit includes a first threshold voltage change detection unit, a first control signal generating unit, and an amplitude control unit. The first threshold voltage change detection unit detects a change in threshold voltage of the switching device from an output voltage controlled via the switching device. The first control signal generating unit generates a first control signal in accordance with an output of the first threshold voltage change detection unit. The amplitude control unit controls the amplitude of the control pulse in accordance with an output of the first control signal generating unit.

9 Claims, 12 Drawing Sheets

[THRESHOLD VOLTAGE CHANGES IN POSITIVE DIRECTION]

[THRESHOLD VOLTAGE CHANGES IN NEGATIVE DIRECTION]

CURRENT DOES NOT SWITCH OFF!

SWITCHING DEVICE IS ALWAYS OFF    SWITCHING DEVICE IS ALWAYS ON

SWITCHING DEVICE COMPENSATION CIRCUIT

CROSS REFERENCE TO RELATED APPLICATION

This application is based upon and claims the benefit of priority of the prior Japanese Patent Application No. 2010-192483, filed on Aug. 30, 2010, the entire contents of which are incorporated herein by reference.

FIELD

The embodiments discussed herein are related to a switching device compensation circuit.

BACKGROUND

In recent years, saving energy resources has become an important concern in various fields, and the field of power supplies, for example, is no exception. More specifically, there has developed, for example, a need to further enhance the efficiency of switching power supplies.

A switching power supply whose output efficiency exceeds 90% has already been proposed in the art, but the current state of the art is approaching a limit when it comes to further enhancing the efficiency, because, for example, the power consumed by the switching transistor (switching device) used in the power supply becomes a bottleneck.

It is believed that the causes for the bottleneck due to the use of the switching transistor are the parasitic resistive component called the ON resistance of the transistor, especially the component residing on the current input side terminal of the transistor, and the capacitive component seen between each terminal of the transistor.

First, the problem attributable to the parasitic resistive component residing on the current input side terminal of the transistor occurs when the transistor is in the ON state. That is, when the transistor is turned on, allowing a current to flow through the transistor, the ON resistance of the transistor causes a voltage to develop between the current-carrying terminals of the transistor due to the ON resistance and the current in accordance with Ohm's law.

Here, since the power consumed by the transistor is equal to the product of the current flowing through the transistor and the voltage developed between the current-carrying terminals of the transistor, this power is not one that is recoverable as the output of the switching power supply, but is converted in the transistor into heat, resulting in a power loss.

Next, the problem attributable to the capacitive component seen between each terminal of the transistor occurs when the current and voltage abruptly change during the ON/OFF operation of the transistor. That is, during the ON/OFF operation of the transistor, the capacitance seen between each terminal of the transistor is charged and discharged.

Further, when the switching operation of the transistor starts, the charging/discharging of the capacitance causes a delay in the timing of switching operation between the voltage and current of the transistor. The larger the capacitance, the greater the timing delay.

As a result, the voltage is applied before the current becomes completely zero and, during this time, a power loss occurs, as in the case of the problem attributable to the parasitic resistive component residing on the current input side terminal of the transistor.

Generally, in the switching power supply, a field-effect transistor (FET) has been used as the switching device, and a typical example of such a transistor is a metal-oxide-semiconductor (MOS) transistor that uses a silicon material. The power loss described above has been a serious problem with this type of MOS (metal-oxide-semiconductor(-semiconductor)) transistor.

To reduce the power loss, a transistor that does not use silicon but uses a compound semiconductor has been developed for use in a switching power supply. Since many of the compound semiconductors have greater electron mobility and larger mutual conductance than silicon, the advantage is that not only is it possible to reduce the ON resistance, but the capacitance seen between each terminal of the transistor is also small.

However, the electrical characteristics in steady-state switching operation of a field-effect transistor that uses a compound semiconductor may vary depending on the ambient temperature or on the applied current and voltage; for example, the threshold voltage of the transistor may vary greatly.

More specifically, the threshold voltage of an n-channel transistor used in a switching power supply is normally expected to be positive, but in the case of a transistor using a compound semiconductor, the threshold voltage may shift into the negative side, depending on the operating conditions or operating environment.

The shift in the negative direction of the threshold voltage of such a field-effect transistor using a compound semiconductor occurs during the switching operation of the transistor; it is said that this phenomenon is strongly dependent on the charge/discharge of electrons from the electron trapping levels believed to exist at the semiconductor surface, the semiconductor-semiconductor interface, and the semiconductor-insulator interface, but at the present time, the details of the cause are not fully understood, nor is it possible to completely control the operation.

The variation of transistor threshold voltage occurs not only in compound semiconductor transistors, such as gallium-nitride high electron mobility transistors (GaN HEMTs), but more or less in various other transistors such as conventional MOS transistors.

The switching device compensation circuit according to any one of the embodiments described herein is widely applicable to various switching devices including compound semiconductor transistors such as GaN HEMTs and field-effect transistors such as MOSFETs.

Further, it will be appreciated that the switching device to be controlled is not limited to the transistor used as the switching device in the switching power supply, but may include switching devices used in various other electrical circuits.

In the related art, various types of switching power supply apparatus have been proposed that use field-effect switching transistors and that improve efficiency by reducing losses during light load periods.
Patent Document 1: International Publication Pamphlet No. WO 2005/078910

SUMMARY

According to an aspect of the embodiments, a switching device compensation circuit performs switching control by applying a control pulse to a control terminal of a switching device. The switching device compensation circuit includes a first threshold voltage change detection unit, a first control signal generating unit, and an amplitude control unit.

The first threshold voltage change detection unit detects a change in threshold voltage of the switching device from an output voltage controlled via the switching device. The first control signal generating unit generates a first control signal in accordance with an output of the first threshold voltage change detection unit. The amplitude control unit controls the amplitude of the control pulse in accordance with an output of the first control signal generating unit.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

DESCRIPTION OF EMBODIMENTS

Before describing embodiments of a switching device compensation circuit in detail, one example of a switching power supply apparatus will be described with reference to FIG. 1, FIG. 2A to FIG. 2D, FIG. 3A to FIG. 3D, and FIG. 4A to FIG. 4C.

Figure 1:
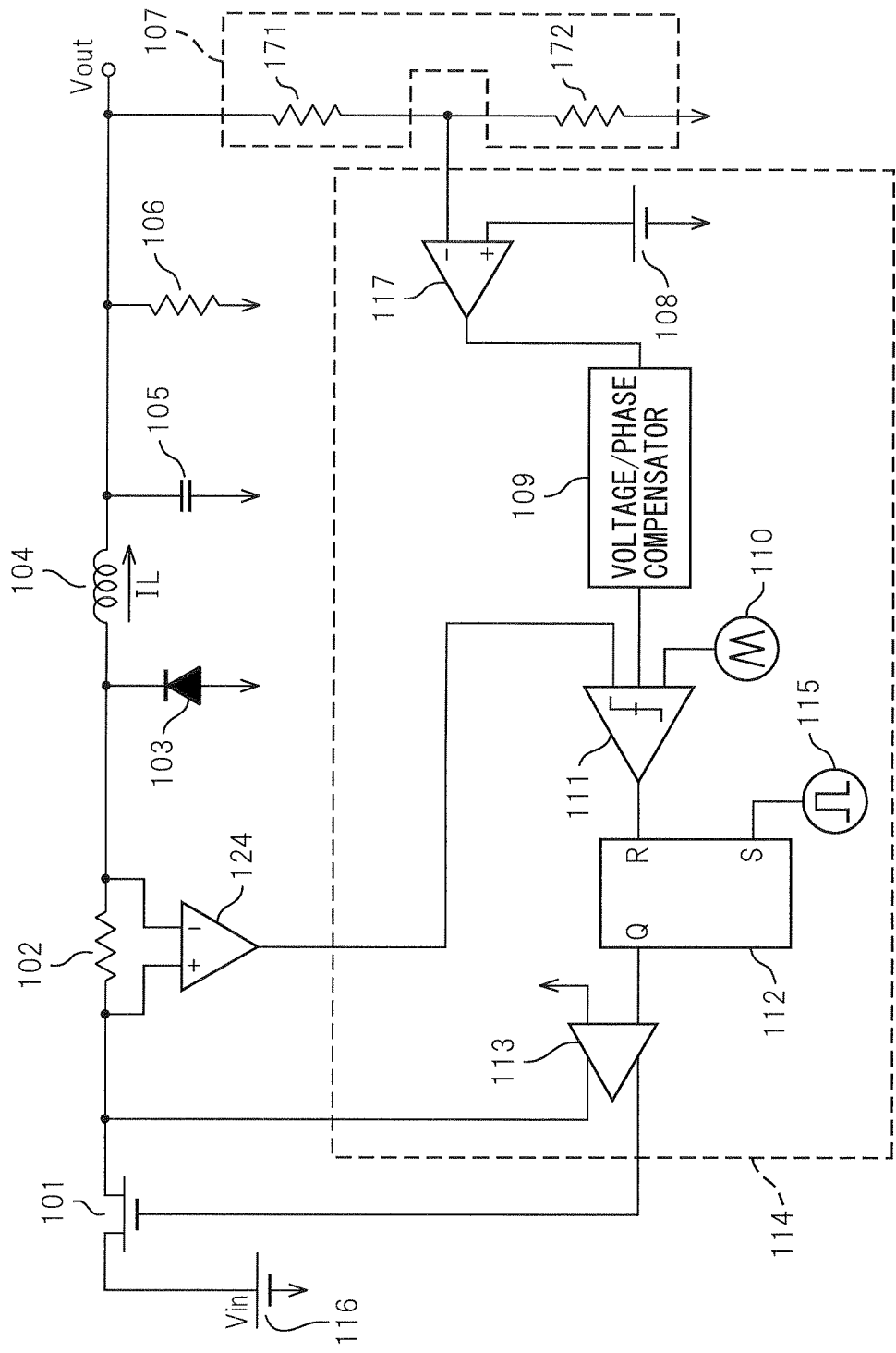
FIG. 1 is a block diagram illustrating one example of a switching power supply apparatus.

FIG. 1 is a block diagram illustrating one example of a switching power supply apparatus (power supply circuit) as a step-down switching power supply apparatus.

In FIG. 1, reference numeral 101 is a switching transistor (switching device), 102 is a current-detecting impedance device (impedance device), and 103 is a diode (diode device). Further, reference numeral 104 is an inductor (inductance device), 105 is a capacitor (smoothing capacitance device), and 106 is a load resistor.

On the other hand, reference numeral 107 is a voltage divider, 108 is a reference power supply, 109 is a voltage/phase compensator, 110 is a sawtooth wave signal source, 111 is a comparator and pulse generator, 112 is a set/reset (SR) latch circuit, and 113 is a gate driver. Further, reference numeral 114 is a gate driver IC, 115 is a clock power supply, 116 is an input power supply, and 117 is an error amplifier.

As illustrated in FIG. 1, in the step-down switching power supply apparatus, the positive terminal of the input power supply 116 whose negative terminal is grounded, and which provides an input voltage Vin, for example, is coupled to the drain of the switching transistor 101.

The source of the switching transistor 101 is coupled to one end of the impedance device 102, and the other end of the impedance device 102 is coupled to the anode of the diode 103 as well as to one end of the inductor 104.

The cathode of the diode 103 is grounded, while the other end of the inductor 104 is coupled to one end of the capacitor 105 as well as to an output voltage terminal that provides an output voltage Vout. The other end of the capacitor 105 is grounded, and the load resistor 106 is coupled between the output voltage terminal and ground.

Here, the impedance device 102 is provided to detect the current (coil current) IL that flows via the switching transistor 101 to the inductor 104, and the voltage developed across the impedance device 102 is detected by a detector 124.

The voltage divider 107 constructed from series-connected resistors 171 and 172 is coupled between the output voltage (Vout) terminal and ground, and the error amplifier 117 compares the output voltage of the voltage divider 107 with the voltage of the reference power supply 108 to feedback-control the output voltage Vout.

The error amplifier 117 produces an output by amplifying the difference between the voltage of the reference power supply 108 applied to its positive input (noninverting input) and the voltage divided between the resistors 171 and 172 in the voltage divider 107 and applied to its negative input (inverting input), and the output of the error amplifier 117 is supplied to the voltage/phase compensator 109.

Here, the circuit is configured so that the output of the error amplifier 117 is supplied via the voltage/phase compensator 109 to the comparator and pulse generator 111, but in an alternative configuration, the voltage/phase compensator 109 may be inserted between the negative input terminal and output terminal of the error amplifier 117 in parallel therewith.

That is, the voltage/phase compensator 109 is a device for adjusting the speed of the temporal change of the desired output voltage by compensating the voltage and phase of the signal output from the error amplifier 117, and the circuit may be implemented in various ways.

Besides the output of the voltage/phase compensator 109, the output of the detector 124 detecting the voltage developed across the impedance device 102 and the output of the sawtooth wave signal source 110 generating a pulse wave are supplied as inputs to the comparator and pulse generator 111.

The comparator and pulse generator 111 compares (performs add and subtract operations on) the various input signals and generates a prescribed pulse signal. The pulse signal generated by the comparator and pulse generator 111 is applied to the reset terminal (R) of the SR latch circuit 112.

Here, the output of the dedicated clock power supply 115 is applied to the set terminal (S) of the SR latch circuit 112 in order to operate the SR latch circuit 112. As a result, the Q output of the SR latch circuit 112 produces a pulse signal with a proper duty cycle, and this pulse signal is supplied to the gate driver 113.

The output of the gate driver 113 is supplied to the gate of the switching transistor 101 to control the switching on and off of the current that flows between the drain and source of the switching transistor 101. In FIG. 1, the source of the switching transistor 101 and ground are coupled to the gate driver 113.

Here, when a compound semiconductor transistor such as a GaN HEMT or a field-effect transistor such as a MOSFET is used as the switching transistor (switching device), the threshold voltage of the transistor may change, depending on the ambient temperature or on the applied current and voltage.

FIG. 2A, FIG. 2B, FIG. 2C, FIG. 2D, FIG. 3A, FIG. 3B, FIG. 3C, and FIG. 3D are diagrams for explaining how the threshold voltage of the switching device changes in the switching power supply apparatus of FIG. 1. FIG. 2A to FIG. 2D illustrate the case where the threshold voltage Vth changes in the positive direction, and FIG. 3A to FIG. 3D illustrate the case where the threshold voltage Vth changes in the negative direction.

While FIG. 2A to FIG. 2D and FIG. 3A to FIG. 3D both illustrate the change in the threshold voltage Vth for the case where an n-channel MOS transistor or a GaN HEMT is used as the switching device, it will be recognized that in the case of other types of switching device also, its threshold voltage may change in like manner depending on the ambient temperature or on the applied voltage, etc.

First, referring to FIG. 2A to FIG. 2D, a description will be given of the case where the threshold voltage Vth of the switching device (switching transistor) changes in the positive direction.

Figure 2A:
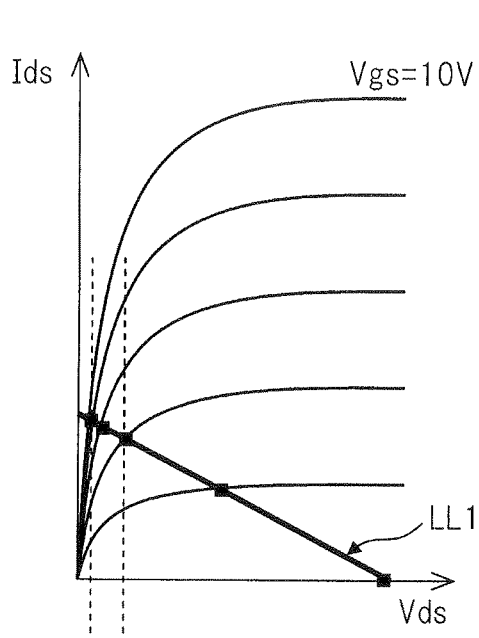
FIG. 2A, FIG. 2B, FIG. 2C, and FIG. 2D are diagrams (part 1) for explaining how the threshold voltage of a switching device changes in the switching power supply apparatus of FIG. 1.

FIG. 2A illustrates the relationship between the drain-to-source voltage Vds and the drain-to-source current Ids (IV characteristics) for various gate-to-source voltages Vgs of the switching transistor; here, reference character LL1 indicates the load line.

Figure 2B:
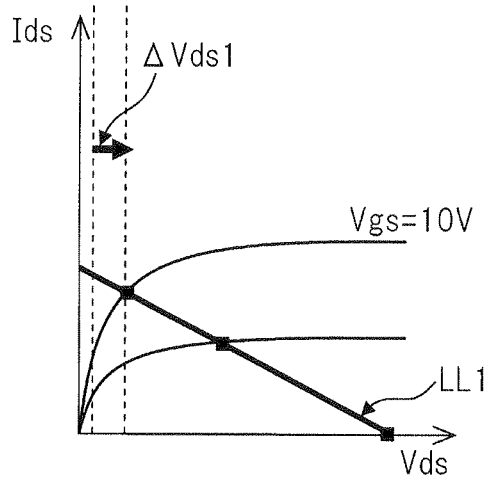
Figure 2C:
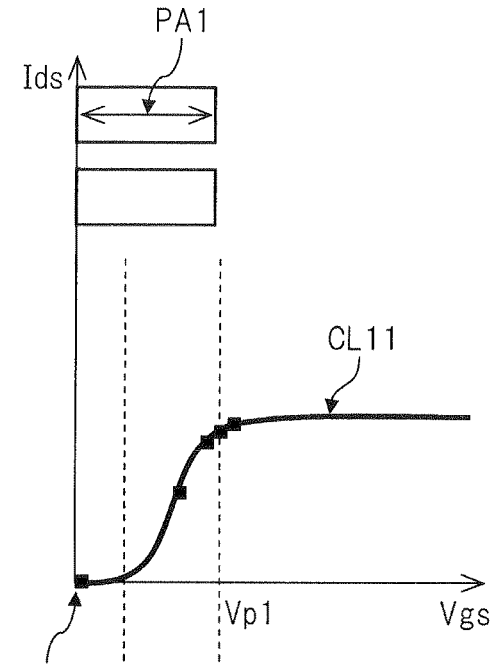

FIG. 2C illustrates the relationship between Vgs and Ids when the threshold voltage of the switching transistor is Vth11, and reference character CL11 indicates the characteristic curve of the switching transistor at that time. Reference character PA1 indicates a control pulse with a voltage amplitude Vp1 that is applied to the gate of the switching transistor.

Figure 2D:
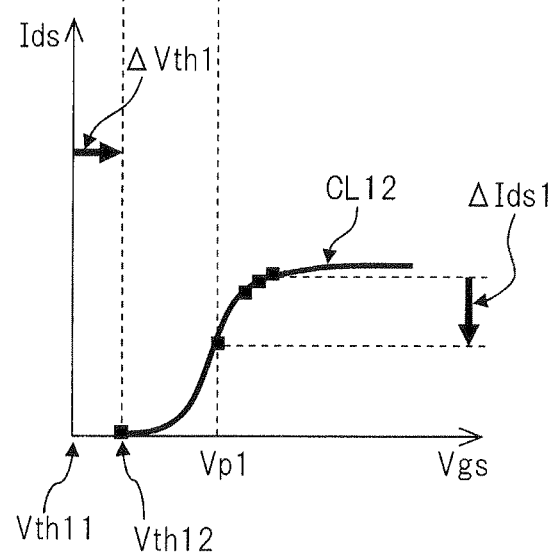

FIG. 2D illustrates the relationship between Vgs and Ids when the threshold voltage of the switching transistor changes from Vth11 in FIG. 2C to Vth12 in the positive direction by ΔVth1, and reference character CL12 indicates the characteristic curve of the switching transistor at that time.

As is apparent from a comparison between FIG. 2C and FIG. 2D, when the threshold voltage changes in the positive direction by ΔVth1, the characteristic curve CL12 of the switching transistor after the change is given by shifting its initial characteristic curve CL11 in the positive direction by ΔVth1.

As illustrated in FIG. 2D, when the threshold voltage changes from Vth11 to Vth12 in the positive direction by ΔVth1, the source-to-drain current Ids decreases by ΔIds1. Further, as illustrated in FIG. 2B, the drain-to-source voltage Vds for each gate-to-source voltage Vgs increases by a given amount (for example, by ΔVds1 when Vgs=10 V).

That is, in the switching power supply apparatus of FIG. 1, if the threshold voltage Vth of the switching device changes, for example, in the positive direction during operation, it becomes difficult with the control pulse PA1 to control the output voltage to the desired voltage value, and the power loss associated with the switching device increases.

Next, referring to FIG. 3A to FIG. 3D, a description will be given of the case where the threshold voltage Vth of the switching transistor changes in the negative direction.

Figure 3A:
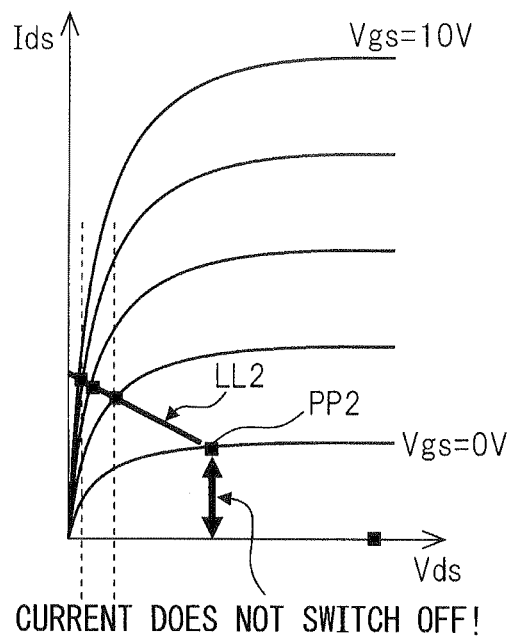
FIG. 3A, FIG. 3B, FIG. 3C, and FIG. 3D are diagrams (part 2) for explaining how the threshold voltage of the switching device changes in the switching power supply apparatus of FIG. 1.
Figure 3B:
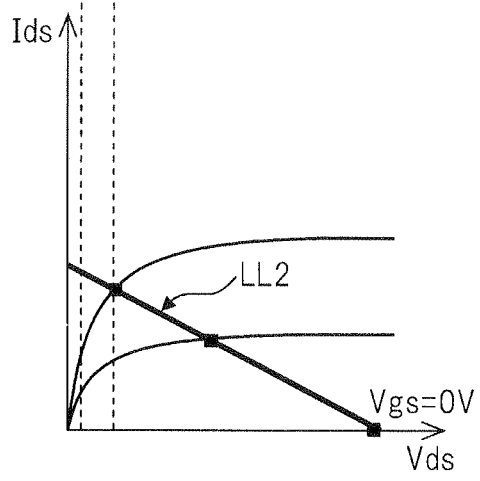

FIG. 3B illustrates the relationship between the drain-to-source voltage Vds and the drain-to-source current Ids (IV characteristics) for various gate-to-source voltages Vgs of the switching transistor; here, reference character LL2 indicates the load line.

Figure 3C:
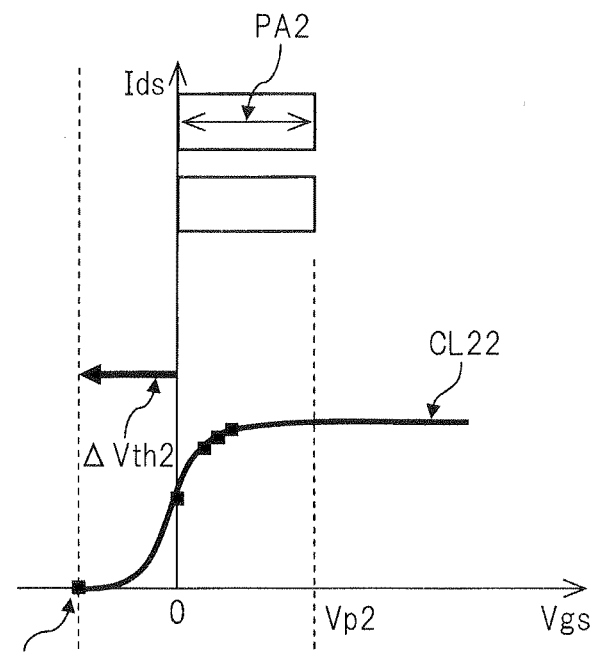
Figure 3D:
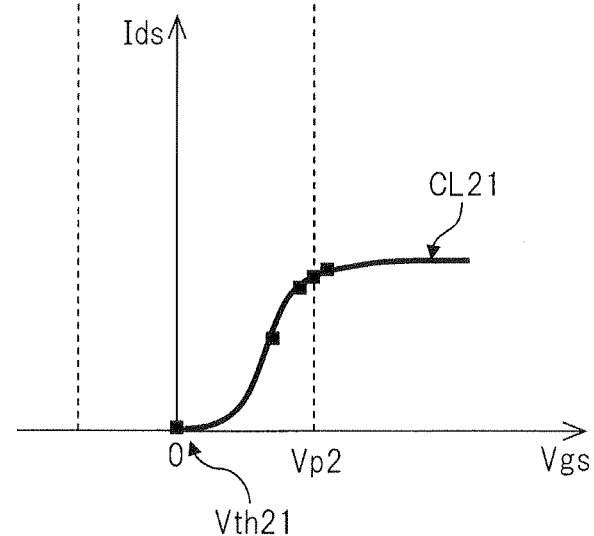

FIG. 3D illustrates the relationship between Vgs and Ids when the threshold voltage of the switching transistor is Vth21 (for example, Vth21=0 V), and reference character CL21 indicates the characteristic curve of the switching transistor at that time. Reference character PA2 indicates a control pulse with a voltage amplitude Vp2 that is applied to the gate of the switching transistor.

FIG. 3C illustrates the relationship between Vgs and Ids when the threshold voltage of the switching transistor changes from Vth21 in FIG. 3D to Vth22 in the negative direction by ΔVth2, and reference character CL22 indicates the characteristic curve of the switching transistor at that time.

Here, FIG. 2A, FIG. 2B, FIG. 2C, and FIG. 2D given above to explain the case where the threshold voltage Vth changes in the positive direction correspond to FIG. 3B, FIG. 3A, FIG. 3D, and FIG. 3C, respectively, given here to explain the case where the threshold voltage Vth changes in the negative direction, though the scale used to plot the graph is different between them.

As is apparent from a comparison between FIG. 3D and FIG. 3C, when the threshold voltage changes in the negative direction by ΔVth2, the characteristic curve CL22 of the switching transistor after the change is given by shifting its initial characteristic curve CL21 in the negative direction by ΔVth2.

This means that even when the control pulse PA2 is not applied to the gate of the switching transistor (that is, Vgs=0 V), for example, the switching transistor turns on and the drain-to-source current Ids flows (does not switch off), as illustrated in FIG. 3A.

That is, in the switching power supply apparatus of FIG. 1, if the threshold voltage Vth of the switching device changes, for example, in the negative direction during operation, the power loss increases and the output efficiency greatly drops. In other words, the temperature rise in the switching transistor may become excessive and may eventually lead to the breakdown of the switching transistor.

Figure 4A:
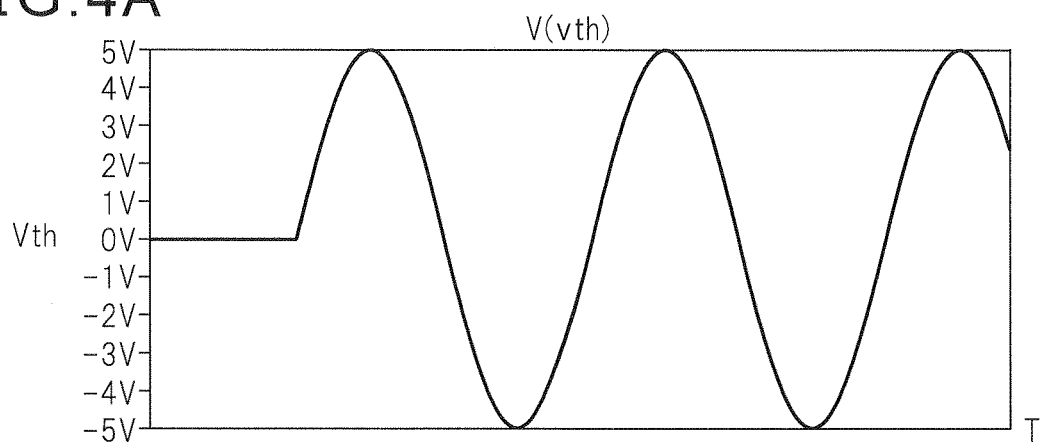
FIG. 4A, FIG. 4B, and FIG. 4C are diagrams for explaining the operation of the switching power supply apparatus of FIG. 1.
Figure 4B:
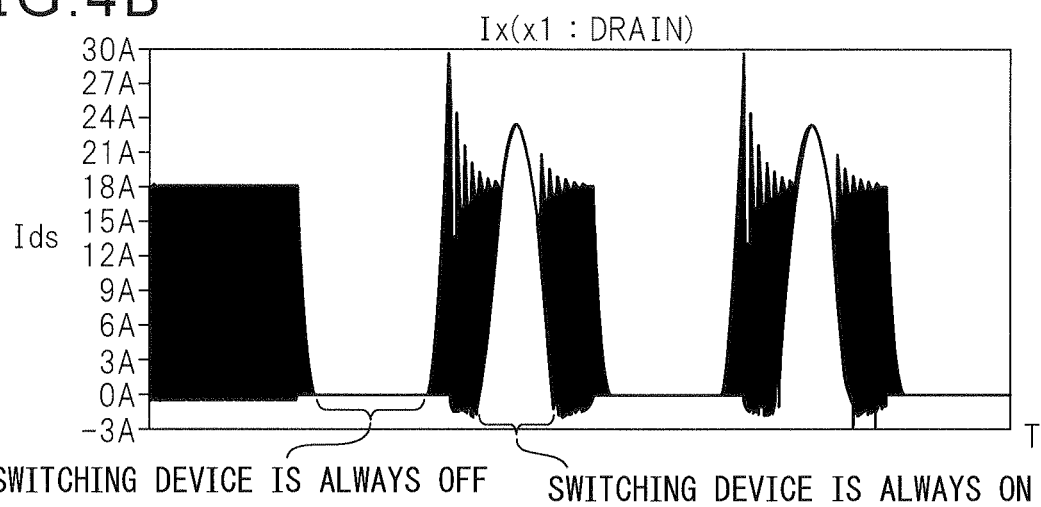
Figure 4C:
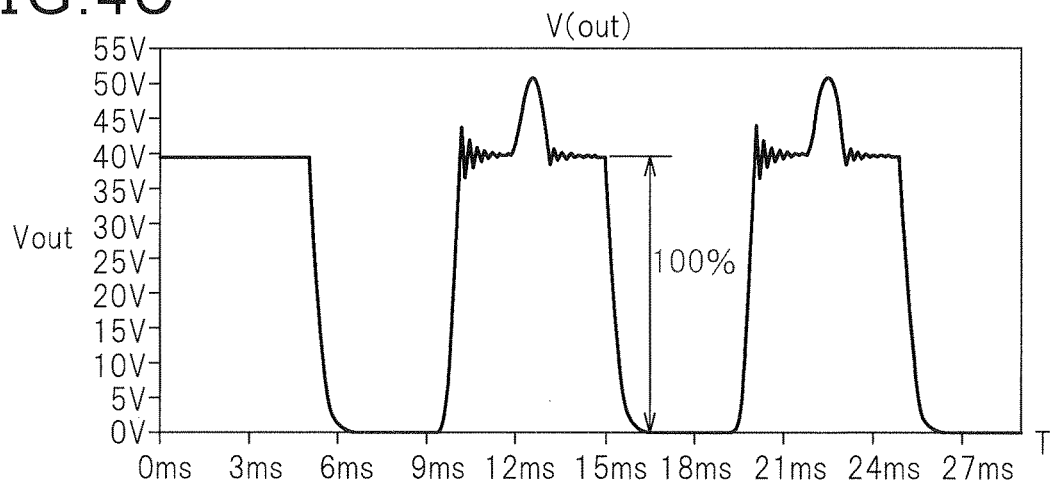

FIG. 4A, FIG. 4B, and FIG. 4C are diagrams for explaining the operation of the switching power supply apparatus of FIG. 1 and illustrate the simulation results obtained by sinusoidally varying the threshold voltage Vth between +5 V and −5 V. FIG. 4A illustrates the variation of the threshold voltage Vth with time T, FIG. 4B illustrates the variation of the drain-to-source current Ids with time T in that case, and FIG. 4C illustrates the variation of the output voltage Vout with time T.

As illustrated in FIG. 4A to FIG. 4C, when the threshold voltage Vth changes as depicted in FIG. 4A, the drain-to-source current Ids changes as depicted in FIG. 4B and the output voltage Vout changes as depicted in FIG. 4C.

That is, when the threshold voltage Vth of the switching device changes in the positive direction, it is not possible to turn on the switching device with the control pulse PA1 of a constant voltage amplitude (Vp1), resulting in a situation where it is not possible to flow the current Ids.

When the threshold voltage Vth of the switching device changes in the negative direction, the switching device is always ON with the control pulse PA2 of a constant voltage amplitude (Vp2), resulting in a situation where the current Ids continues to flow.

In this way, when the threshold voltage Vth of the switching device changes in the positive or negative direction, it is not possible to maintain the output voltage Vout at the desired voltage (for example, about 40 V), and the output voltage Vout varies greatly by more than 100%. Furthermore, the power loss due to the switching device increases, and there may also arise the possibility of the switching device breaking down.

Embodiments of the switching device compensation circuit will be described in detail below with reference to the accompanying drawings.

Figure 5:
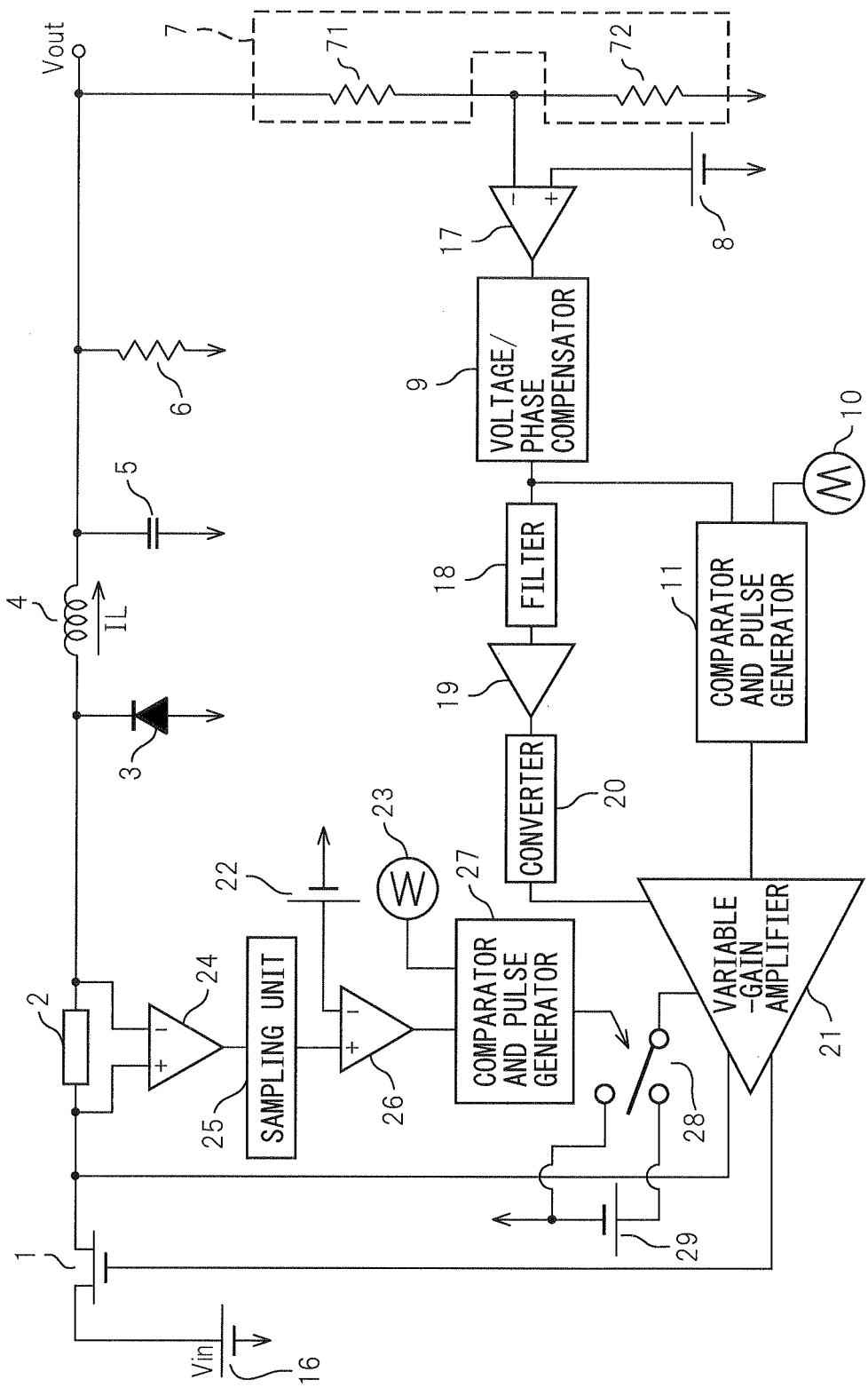
FIG. 5 is a block diagram illustrating one example of a switching power supply apparatus to which a switching device compensation circuit of the present embodiment is applied.

FIG. 5 is a block diagram illustrating one example of a switching power supply apparatus (power supply circuit) as a step-down switching power supply apparatus to which the switching device compensation circuit of the present embodiment is applied.

In FIG. 5, reference numeral 1 is a switching transistor (switching device), 2 is a current-detecting impedance device (impedance device), and 3 is a diode (diode device). Reference numeral 4 is an inductor (inductance device), 5 is a capacitor (smoothing capacitance device), 6 is a load resistor, and 7 is a voltage divider.

Further, reference numeral 8 is a reference power supply (first reference power supply), 9 is a voltage/phase compensator (first voltage/phase compensator), 10 is a sawtooth wave signal source (first sawtooth wave signal source), 11 is a comparator and pulse generator (first comparator and pulse generator), and 16 is an input power supply.

Reference numeral 17 is an error amplifier (first error amplifier), 18 is a filter (first filter), 19 is a buffer amplifier (first buffer amplifier), 20 is a converter (first converter), 21 is a variable-gain amplifier, 22 is a reference power supply (second reference power supply), and 24 is a detector.

Further, reference numeral 23 is a sawtooth wave signal source (second sawtooth wave signal source), 25 is a sampling unit, 26 is an error amplifier (second error amplifier), 27 is a comparator and pulse generator (second comparator and pulse generator), 28 is a switch, and 29 is a DC voltage level power supply.

As is apparent from a comparison between FIG. 5 and the previously given FIG. 1, the step-down switching power supply apparatus of FIG. 5 differs from the power supply apparatus of FIG. 1 by the inclusion of a circuit for compensating the amplitude of the control pulse to be supplied to the gate of the switching transistor 1.

As illustrated in FIG. 5, in the step-down switching power supply apparatus, the positive terminal of the input power supply 16 whose negative terminal is grounded, and which provides an input voltage Vin, for example, is coupled to the drain of the switching transistor 1.

The source of the switching transistor 1 is coupled to one end of the impedance device 2, and the other end of the impedance device 2 is coupled to the anode of the diode 3 as well as to one end of the inductor 4.

The cathode of the diode 3 is grounded, while the other end of the inductor 4 is coupled to one end of the capacitor 5 as well as to an output voltage terminal that provides an output voltage Vout.

The other end of the capacitor 5 is grounded, and the load resistor 6 is coupled between the output voltage terminal and ground. Here, a transistor whose switching operation is controllable may be substituted for the diode (diode device) 3 in order to achieve synchronous rectification in the switching power supply apparatus.

The impedance device 2 is provided to detect the current (coil current) IL that flows via the switching transistor 1 to the inductor 4, and the voltage developed across the impedance device 2 is detected by the detector 24.

The voltage divider 7 constructed from series-connected resistors 71 and 72 is coupled between the output voltage (Vout) terminal and ground, and the error amplifier 17 compares the output voltage of the voltage divider 7 with the voltage of the reference power supply 8 to feedback-control the output voltage Vout.

The error amplifier 17 produces an output by amplifying the difference between the voltage of the reference power supply 8 applied to its positive input (noninverting input) and the voltage divided between the resistors 71 and 72 in the voltage divider 7 and applied to its negative input (inverting input), and the output of the error amplifier 17 is supplied to the voltage/phase compensator 9.

Here, the circuit is configured so that the output of the error amplifier 17 is supplied via the voltage/phase compensator 9 to both the comparator and pulse generator 11 and the filter 18, but in an alternative configuration, the voltage/phase compensator 9 may be inserted between the negative input terminal and output terminal of the error amplifier 17 in parallel therewith.

That is, the voltage/phase compensator 9 is a device for adjusting the speed of the temporal change of the desired output voltage by compensating the voltage and phase of the signal output from the error amplifier 17, and the circuit may be implemented in various ways.

More specifically, rather than inserting the voltage/phase compensator 9 at the output of the error amplifier 17, various other implementations are possible; for example, it may be inserted between the negative input terminal and output terminal of the error amplifier 17 in parallel therewith, or alternatively, it may be inserted between ground and the negative input terminal of the error amplifier 17.

The output of the voltage/phase compensator 9 is supplied to the filter 18 as well as to one input of the comparator and pulse generator 11 whose other input is coupled to the output of the sawtooth wave signal source 10 that generates a pulse wave.

The output of the comparator and pulse generator 11 is supplied to the variable-gain amplifier 21, while on the other hand, the output of the error amplifier 17, which is passed through the voltage/phase compensator 9 and the filter 18, is amplified by the buffer amplifier 19 and then supplied via the converter 20 to the variable-gain amplifier 21.

Here, the filter 18, the buffer amplifier 19, and the converter 20 together correspond to a first control signal generating unit that generates a first control signal for adjusting the amplitude of the control pulse to be supplied via the variable-gain amplifier 21 to the gate of the switching transistor 1.

The first control signal generating unit generates the first control signal for adjusting the amplitude of the control pulse to be supplied to the gate of the switching transistor 1 in accordance with the change in the threshold voltage of the switching transistor 1 detected from the output voltage Vout of the switching power supply apparatus.

This means that the amplitude of the output of the comparator and pulse generator 11 supplied to the variable-gain amplifier 21 (the amplitude of the control pulse to be supplied to the gate of the switching transistor 1) is adjusted, for example, by the output of the first control signal generating unit (the converter 20).

On the other hand, the voltage developed across the impedance device 2 and detected by the detector 24 is supplied to the sampling unit 25 to be described later, and the output of the sampling unit 25 is applied to the positive input terminal of the error amplifier 26.

The error amplifier 26 amplifies a difference voltage corresponding to the difference between the output of the reference power supply 22 applied to its negative input terminal and the output of the sampling unit 25 applied to its positive input terminal, and supplies the difference voltage to the comparator and pulse generator 27.

The comparator and pulse generator 27 is also supplied with the output of the sawtooth wave signal source 23, and the output of the comparator and pulse generator 27 is used to control the opening and closing of the switch 28 coupled to the DC voltage level power supply 29.

Here, the reference power supply 22, the sawtooth wave signal source 23, the error amplifier 26, and the comparator and pulse generator 27 together correspond to a second control signal generating unit.

The second control signal generating unit generates a second control signal in accordance with the change in the threshold voltage of the switching transistor 1 detected from the current flowing through the switching transistor 1 (the voltage developed across the impedance device 2).

The second control signal is used to adjust the amplitude of the control pulse to be supplied to the gate of the switching transistor 1.

More specifically, the DC voltage level to be applied to the variable-gain amplifier 21 (the offset voltage for the control pulse to be supplied to the gate of the switching transistor 1) is adjusted by controlling the switch 28 in accordance with the output of the second control signal generating unit (the output of the comparator and pulse generator 27).

The switching device compensation circuit of the present embodiment is not limited in its application to the switching transistor for use in the step-down switching power supply apparatus, but is widely applicable to various circuits that use switching devices whose threshold voltages tend to vary.

That the threshold voltage of the transistor varies (changes) means either (1) that the desired current does not flow at the gate voltage that drives the transistor or (2) that the current (Ids) flowing through the transistor does not become zero during the on/off operation of the gate.

First, the above situation (1) occurs in many cases when the threshold voltage of the transistor (switching transistor 1) is shifted in the positive direction from the initial state. To correct this situation, the DC gate voltage of the transistor, for example, need only be shifted in the positive direction to increase the pulse voltage (the amplitude of the control pulse) to be applied to the gate of the transistor.

The first control signal generating unit accomplishes this; that is, the first control signal is generated from the output of the error amplifier 17 (the voltage/phase compensator 9) by passing the output through the filter 18, the buffer amplifier 19, and the converter 20, and this first control signal is supplied to the gain adjusting terminal of the variable-gain amplifier 21.

Here, the output voltage Vout of the switching power supply apparatus is divided by the voltage divider 7, and the divided voltage is supplied to the error amplifier 17 where it is compared with the output voltage of the reference power supply 8.

In this case, if the output voltage Vout is not equal to the desired voltage, the output voltage of the error amplifier 17 does not become zero, but produces an output voltage of a certain level. This output voltage level of the error amplifier 17 is not proportional to the threshold voltage Vth.

In view of this, the converter 20 is provided to convert the output voltage level of the error amplifier 17 into a suitable value, and the output of the converter 20 is used to control the gain of the variable-gain amplifier 21 and thereby control the amplitude of the control pulse to be supplied to the switching transistor 1. Thus, the switching transistor 1 is controlled so that the current Ids flowing through the transistor 1 is maintained at the proper value.

In this way, the first control signal generating unit generates the first control signal for adjusting the amplitude of the control pulse to be supplied to the gate of the switching transistor 1 in accordance with the output voltage Vout of the switching power supply apparatus.

Of course, in addition to controlling the gain of the variable-gain amplifier 21 by the converter 20, the offset voltage may be adjusted by shifting the DC voltage level of the control pulse to be supplied to the gate of the switching transistor 1.

Next, the above situation (2) occurs in many cases when the threshold voltage of the transistor (switching transistor 1) is shifted in the negative direction from the initial state. To correct this situation, the DC gate voltage of the transistor, for example, need only be shifted in the negative direction so that any DC current does not flow when the pulse voltage applied to the gate of the transistor is 0 V.

That is, when the voltage of the control pulse applied to the gate of the transistor is 0 V, the DC component of the drain current Ids of the transistor is monitored, and control is performed so that the current is constantly held at 0.

The second control signal generating unit accomplishes this; that is, a comparison is made by the error amplifier 26 to see if the signal output from the sampling unit 25 is identical with the desired signal level (the output voltage of the reference power supply 22), and the output of the error amplifier 26 is supplied to the comparator and pulse generator 27.

The comparator and pulse generator 27 generates the second control signal from the output of the error amplifier 26 and the output of the sawtooth wave signal source 23, and the opening and closing of the switch 28 is controlled by the second control signal.

Here, the switch 28 is used to control the level of the DC voltage to be supplied to the variable-gain amplifier 21, and selects one or the other of the voltages at the two ends of the DC voltage level power supply 29 and supplies the selected one to the variable-gain amplifier 21.

The detector 24 detects the voltage developed across the impedance device 2, and the DC component (bottom-hold value) of the signal output from the detector 24 is extracted by the sampling unit 25.

In this way, the second control signal generating unit generates the second control signal for adjusting the DC voltage level of the control pulse to be supplied to the gate of the switching transistor 1 in accordance with the voltage developed across the impedance device 2, that is, the current Ids flowing through the transistor 1.

Figure 6:
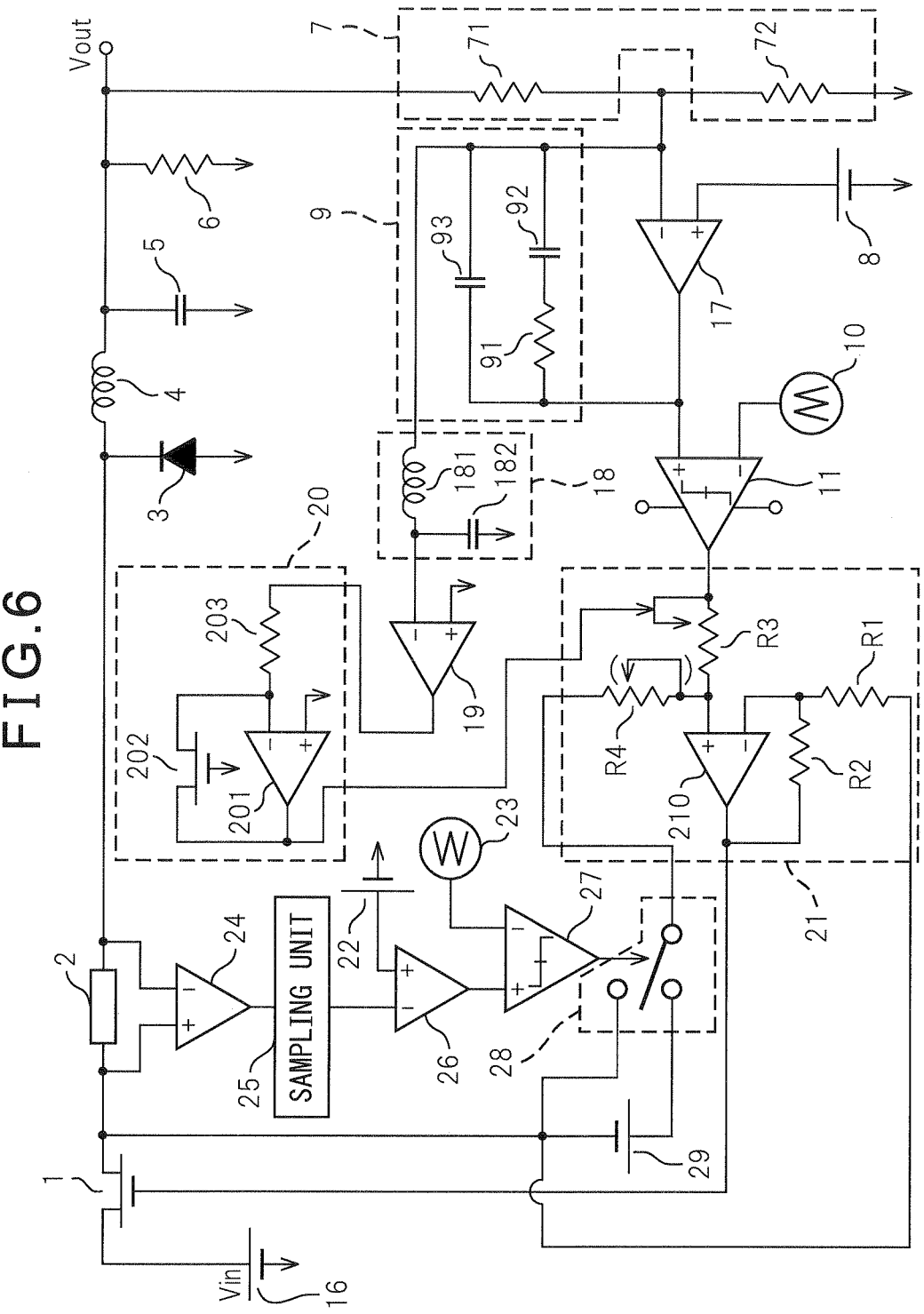
FIG. 6 is a circuit diagram illustrating a specific example of the switching power supply apparatus of FIG. 5.

FIG. 6 is a circuit diagram illustrating a specific example of the switching power supply apparatus of FIG. 5; here, the voltage/phase compensator 9, the filter 18, the converter 20, the variable-gain amplifier 21, etc. are each depicted in the form of a specific circuit. In the circuit of FIG. 6, the voltage/phase compensator 9 is not placed after the error amplifier 17 but inserted between the negative input terminal and output terminal of the error amplifier 17.

As illustrated in FIG. 6, the voltage/phase compensator 9 includes a series coupling of a resistor 91 and a capacitor 92, and a capacitor 93, both inserted between the negative input terminal and output terminal of the error amplifier 17. The voltage/phase compensator 9 adjusts the speed of the temporal change of the desired output voltage and thus controls the switching power supply apparatus so that the entire operation of the apparatus does not become unstable.

The voltage/phase compensator 9 may be implemented in various ways; for example, it may be placed between the output of the error amplifier 17 and the input of the comparator and pulse generator 11, as depicted in FIG. 5, or alternatively, it may be inserted between ground and the negative input terminal of the error amplifier 17.

The filter 18 includes an inductor 181 and a capacitor 182, and has the function of bringing the output signal of the error amplifier 17 closer to the value of the DC. The output of the filter 18 is coupled to the negative input of the buffer amplifier 19 whose positive input is grounded, and the output level of the filter 18 thus adjusted by the buffer amplifier 19 is supplied to the converter 20.

The converter 20 may be constructed, for example, as a voltage conversion circuit using a field-effect transistor, and includes an amplifier 201, a transistor 202, and a resistor 203. The converter 20 converts the output of the error amplifier 17, supplied via the filter 18 and the buffer amplifier 19, into a suitable voltage or voltage function, and supplies the thus converted output to the gain adjusting terminal of the variable-gain amplifier 21.

The variable-gain amplifier 21 includes resistors R1, R2, R3, and R4, and an amplifier 210. The resistor R3 is a variable resistor whose resistance value is controlled by the output of the converter 20 (the first control signal generating unit) thereby to adjust the amplitude of the output of the comparator and pulse generator 11, that is, the amplitude of the control pulse to be supplied to the gate of the switching transistor 1.

Connected to the variable-gain amplifier 21 are the output terminal of the comparator and pulse generator 11, the negative potential terminal of the DC voltage level power supply 29, and the switching terminal of the switch 28 which selects the positive or negative potential terminal of the DC voltage level power supply 29 for coupling.

Here, the negative potential terminal of the DC voltage level power supply 29 is coupled to the source of the switching transistor 1, so that the voltage of the DC voltage level power supply 29 is at the same potential as the source voltage Vs of the switching transistor 1.

Further, the switch 28 selects, under the control of the output of the comparator and pulse generator 27, the negative potential (the source voltage Vs of the switching transistor 1) or the positive potential of the DC voltage level power supply 29, and the selected DC voltage level is supplied to the variable-gain amplifier 21.

The switching terminal of the switch 28 is coupled to the positive input of the amplifier 210 via the resistor R4, and the output of the amplifier 210 is coupled to the gate of the switching transistor 1.

The resistor R2 is coupled between the negative input terminal and output terminal of the amplifier 210, and the resistance value of the resistor R3 is variable under the control of the output of the comparator and pulse generator 11; similarly, the resistance value of the resistor R4 is variable under the control of the output of the converter 20 (the amplifier 201).

Here, with the switch 28 controlled by the output of the comparator and pulse generator 27 (the second control signal from the second control signal generating unit), the offset voltage is adjusted by shifting the DC voltage level of the control pulse to be supplied to the gate of the switching transistor 1.

As will be described hereinafter with reference to FIG. 7, the offset voltage may also be adjusted by controlling the resistance value of the resistor R4 as a variable resistor by the output (second control signal) of the second control signal generating unit.

Figure 7:
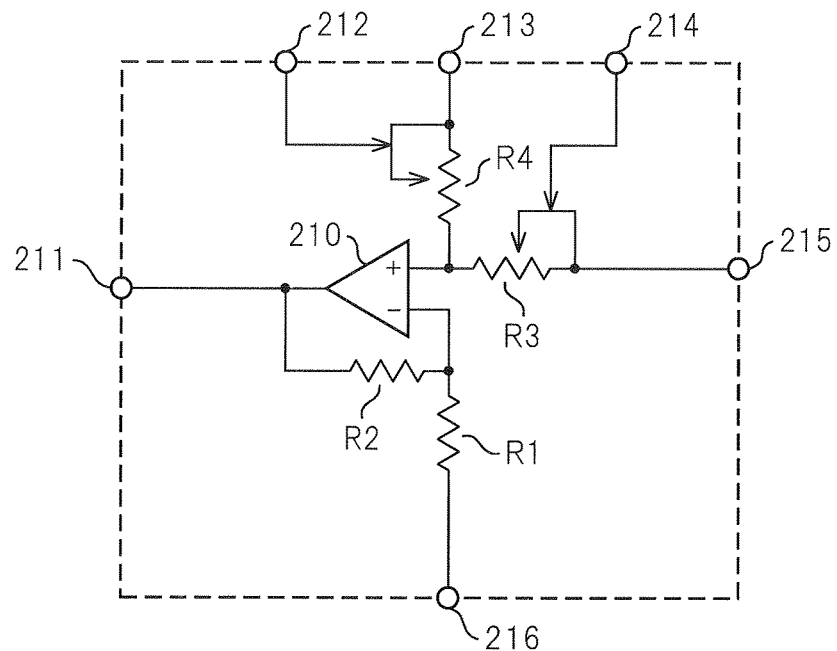
FIG. 7 is a circuit diagram illustrating specifically a variable-gain amplifier incorporated in the switching power supply apparatus of FIG. 6.

FIG. 7 is a circuit diagram illustrating specifically the variable-gain amplifier incorporated in the switching power supply apparatus of FIG. 6. As illustrated in FIG. 7, the variable-gain amplifier 21 includes the resistors R1, R2, R3, and R4, and the amplifier 210, and the resistors R3 and R4 are variable resistors.

Here, the amplitude of the signal supplied via a terminal 215 to the positive input terminal of the amplifier 210 (i.e., the output signal from the comparator and pulse generator 11) is, for example, adjusted in accordance with the resistance value of the variable resistor R3 which is controlled by the output of the converter 20 (the first control signal generating unit) supplied via a terminal 214. In this way, the amplitude of the control pulse, which is output via a terminal 211 and supplied to the gate of the switching transistor 1, is adjusted.

On the other hand, the DC voltage level applied via a terminal 213 is, for example, adjusted in accordance with the resistance value of the variable resistor R4 which is controlled by the output of the comparator and pulse generator 27 (the second control signal generating unit). In this way, the offset voltage for the control pulse, which is output via the terminal 211 and supplied to the gate of the switching transistor 1, is adjusted.

The specific circuit configuration of the variable-gain amplifier 21 and the control method thereof may be variously modified; for example, in the example previously described with reference to FIG. 6, the DC voltage level to be applied via the terminal 213 is directly controlled by the switch 28. In the example of FIG. 6, the source voltage Vs of the switching transistor 1 is applied to a terminal 216.

Figure 8A:
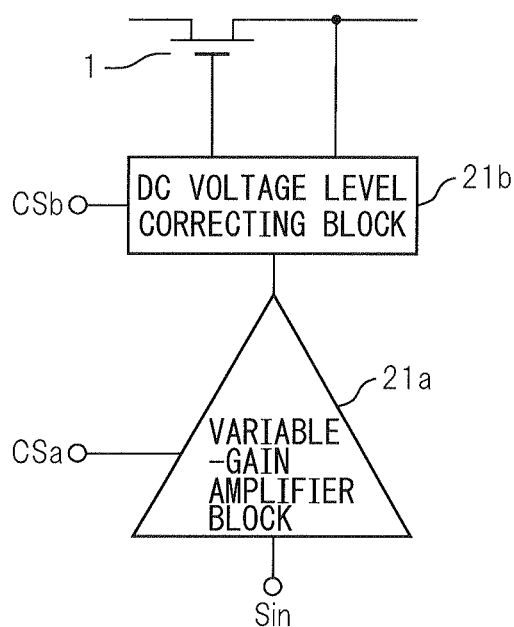
FIG. 8A and FIG. 8B are block diagrams for explaining modified examples of the variable-gain amplifier of FIG. 7.
Figure 8B:
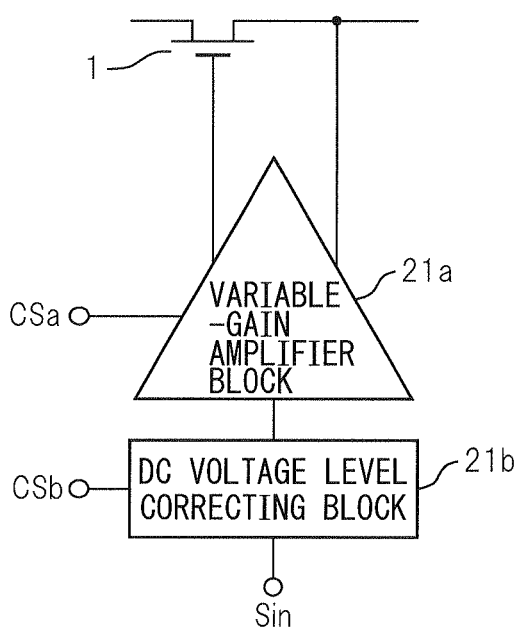

FIG. 8A and FIG. 8B are block diagrams for explaining modified examples of the variable-gain amplifier of FIG. 7. As described above, the variable-gain amplifier 21 is configured to be able to simultaneously adjust both the amplitude (gain) of the control pulse to be supplied to the gate of the switching transistor 1 and the offset voltage thereof (the DC voltage level).

However, these functions may be implemented using separate circuit blocks, as illustrated in FIG. 8A or FIG. 8B. Here, reference numeral 21*a* is a variable-gain amplifier block for adjusting the amplitude of the control pulse, and 21*b* is a DC voltage level correcting block (level shift circuit) for adjusting the offset voltage for the control pulse.

That is, as illustrated in FIG. 8A, the input signal Sin may first be passed, for example, through the variable-gain amplifier block 21*a* which adjusts the gain in accordance with a control signal CSa, and then passed through the DC voltage level correcting block 21*b* which adjusts the DC voltage level in accordance with a control signal CSb.

Alternatively, as illustrated in FIG. 8B, the input signal Sin may first be passed, for example, through the DC voltage level correcting block 21*b* which adjusts the DC voltage level in accordance with the control signal CSb, and then passed through the variable-gain amplifier block 21*a* which adjusts the gain in accordance with the control signal CSa.

That is, the amplitude (gain) of the control pulse to be supplied to the gate of the switching transistor 1 and the offset voltage thereof (the DC voltage level) may be adjusted simultaneously or separately in any order, by using the same or separate circuit blocks.

Figure 9A:
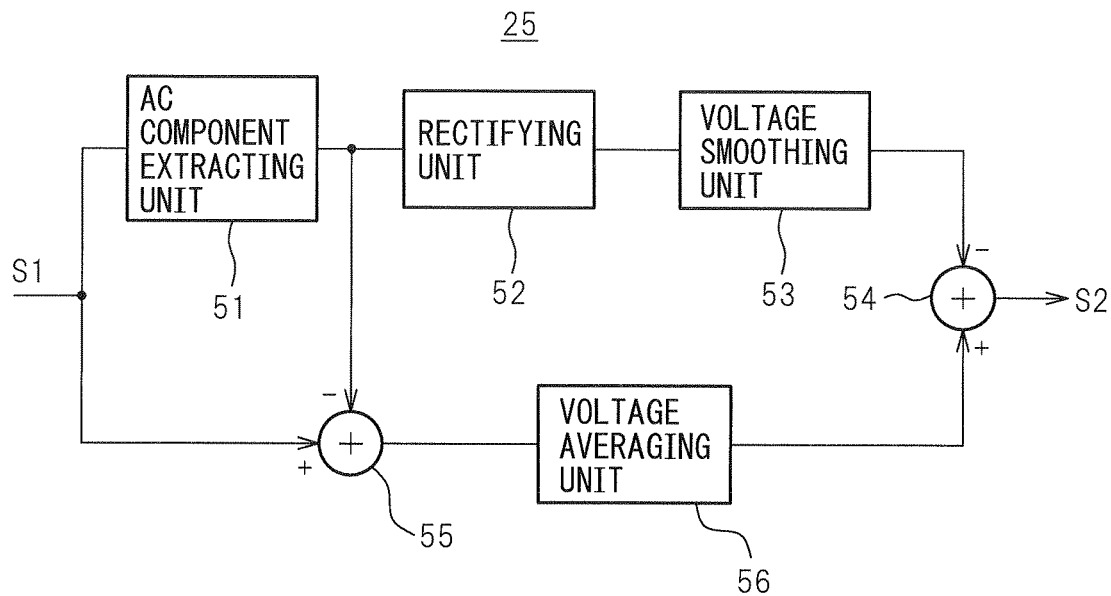
FIG. 9A and FIG. 9B are diagrams for explaining a sampling unit in the switching power supply apparatus of FIG. 6.
Figure 9B:
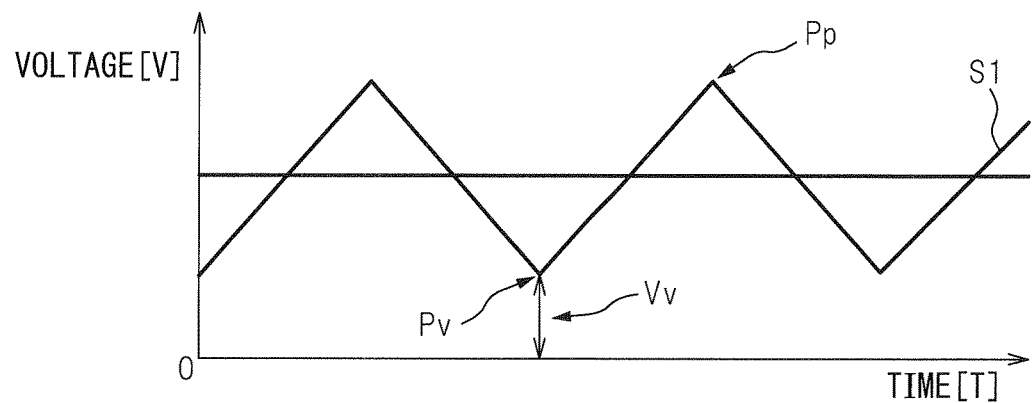

FIG. 9A and FIG. 9B are diagrams for explaining the sampling unit in the switching power supply apparatus of FIG. 6; FIG. 9A is a block diagram of the sampling unit, and FIG. 9B is a diagram for explaining the operation of the sampling unit.

As illustrated in FIG. 9A, the sampling unit 25 includes an AC component extracting unit 51, a rectifying unit 52, a voltage smoothing unit 53, adders 54 and 55, and a voltage averaging unit 56.

The AC component extracting unit 51 extracts the AC component from the input signal S1 (i.e., the output signal of the detector 24), and supplies it to the rectifying unit 52 and also to the negative input of the adder 55. The rectifying unit 52 rectifies the AC component extracted by the AC component extracting unit 51 and supplies its output to the voltage smoothing unit 53.

The adder 55 subtracts from the DC component of the input signal 51 the AC component extracted by the AC component extracting unit 51, and supplies the result to the voltage averaging unit 56. The adder 54 subtracts the output of the voltage smoothing unit 53 from the output of the voltage averaging unit 56, and outputs a signal S2.

That is, as illustrated in FIG. 9B, the sampling unit 25 functions as a valley-hold circuit that holds a voltage Vv corresponding to the minimum value (valley) Pv of the AC input signal S1 on which the offset voltage is superimposed. In FIG. 9B, reference character Pp indicates the maximum value (peak) of the input signal S1.

Figure 10:
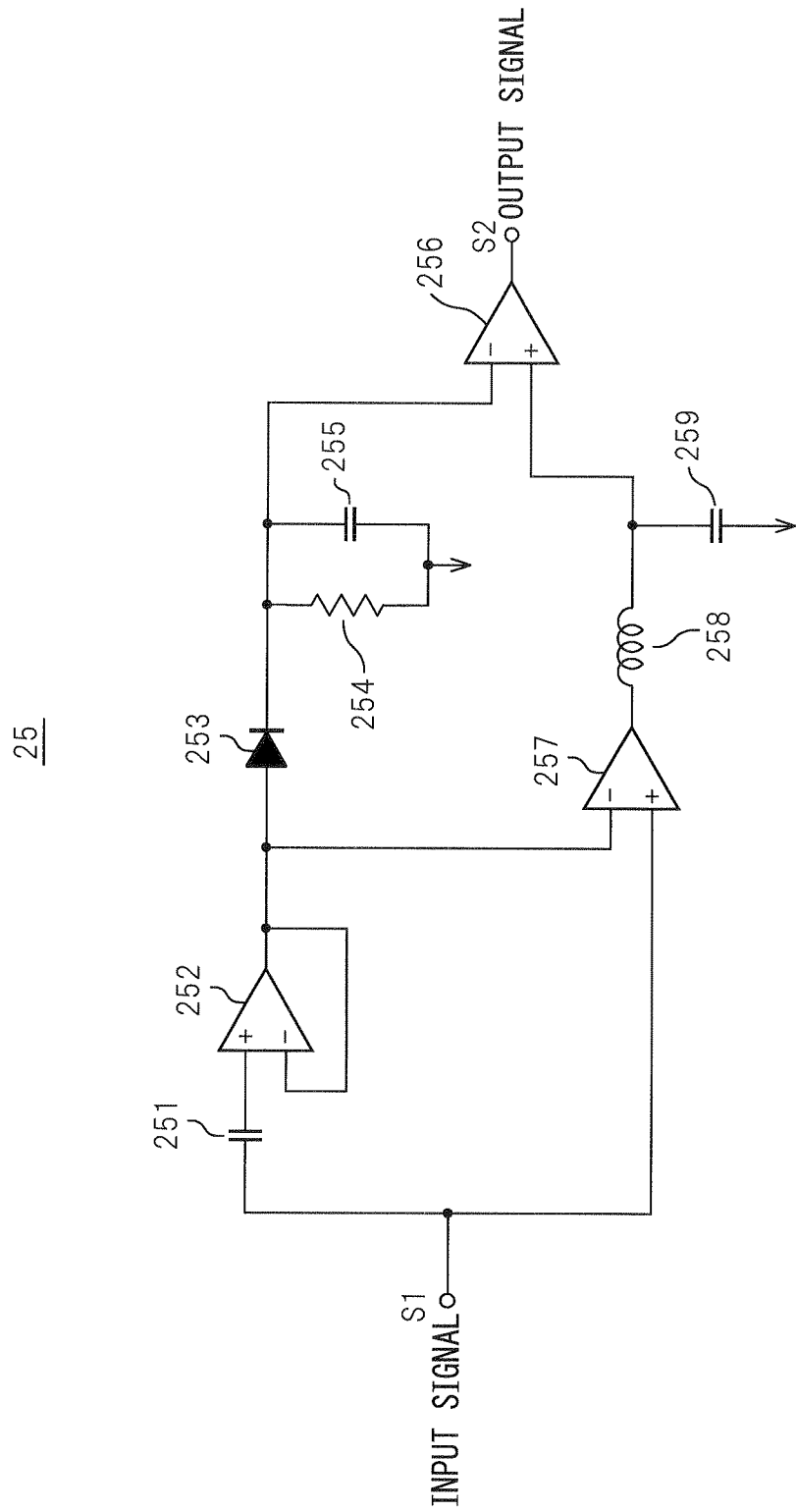
FIG. 10 is a circuit diagram illustrating one example of the sampling unit of FIG. 9A.

FIG. 10 is a circuit diagram illustrating one example of the sampling unit of FIG. 9A. As illustrated in FIG. 10, the sampling unit 25 includes capacitors 251, 255, and 259, buffer amplifiers 252 and 257, a diode 253, a resistor 254, an inductor 258, and a buffering differential amplifier 256.

As is apparent from a comparison between FIG. 10 and FIG. 9A, the AC component extracting unit 51 corresponds to the capacitor 251 and buffer amplifier 252, the rectifying unit 52 corresponds to the diode 253, and the voltage smoothing unit 53 corresponds to the resistor 254 and capacitor 255.

Further, the adder 54 corresponds to the buffering differential amplifier 256, the adder 55 corresponds to the buffer amplifier 257, and the voltage averaging unit 56 corresponds to the inductor 258 and capacitor 258. Thus, the sampling unit 25 of FIG. 9A may be implemented using the circuit depicted in FIG. 10.

More specifically, first the input signal S1 is separated into its AC and DC components, and the AC component is supplied via the capacitor 251 to the positive input terminal of the buffer amplifier 252. The negative input terminal of the buffer amplifier 252 is coupled to its output terminal.

The DC component of the input signal S1 is supplied to the positive input terminal of the buffer amplifier 257, while the output signal from the buffer amplifier 252 is supplied to the negative input terminal of the buffer amplifier 257. The output signal from the buffer amplifier 257 is supplied via the inductor 258 to the positive input terminal of the buffering differential amplifier 256.

The capacitor 259 is provided between ground and the positive input terminal of the buffering differential amplifier 256, and the voltage averaged through a low-pass filter formed by the inductor 258 and capacitor 259 is supplied to the positive input terminal of the buffering differential amplifier 256.

On the other hand, the output signal from the buffer amplifier 252 is rectified (half-wave rectified) by the diode 253 and supplied to the negative input terminal of the buffering differential amplifier 256. The resistor 254 and capacitor 255 are provided between ground and the negative input terminal of the buffering differential amplifier 256 so that the signal rectified by the diode 253 is smoothed before being supplied to the negative input terminal of the buffering differential amplifier 256.

Here, the diode 253 detects the valley (peak) voltage of the AC input signal S1, and this valley voltage is smoothed before being supplied to the negative input terminal of the buffering differential amplifier 256.

The buffering differential amplifier 256 receives at its positive terminal the output signal of the buffer amplifier 257 averaged through the low-pass filter formed by the inductor 258 and capacitor 259, and amplifies the difference between the averaged voltage signal and the smoothed valley voltage signal received at its negative input terminal.

Thus, the buffering differential amplifier 256 outputs the signal S2 representing the minimum DC signal component (valley-hold voltage) of the input signal S1 from which the AC component has been removed.

Figure 11A:
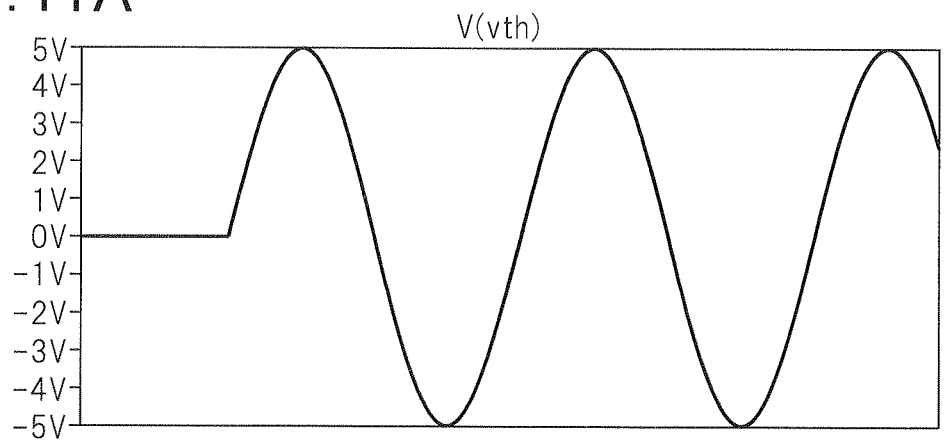
FIG. 11A, FIG. 11B, and FIG. 11C are diagrams for explaining the operation of the switching power supply apparatus of FIG. 6.
Figure 11B:
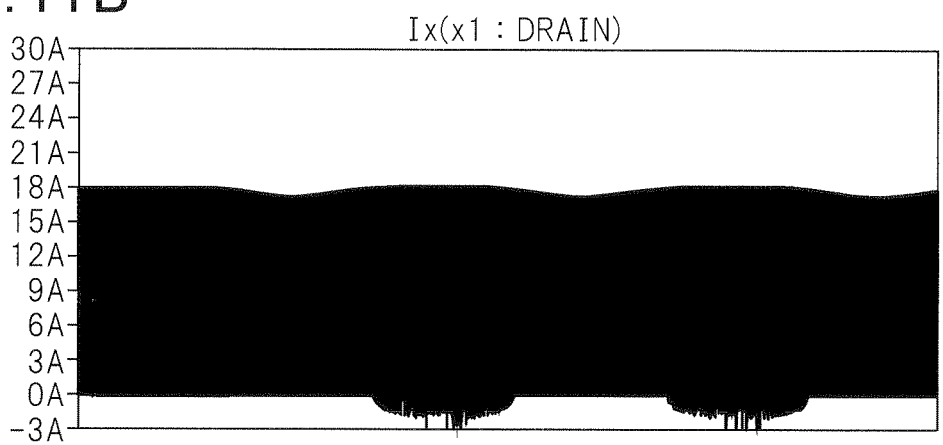
Figure 11C:
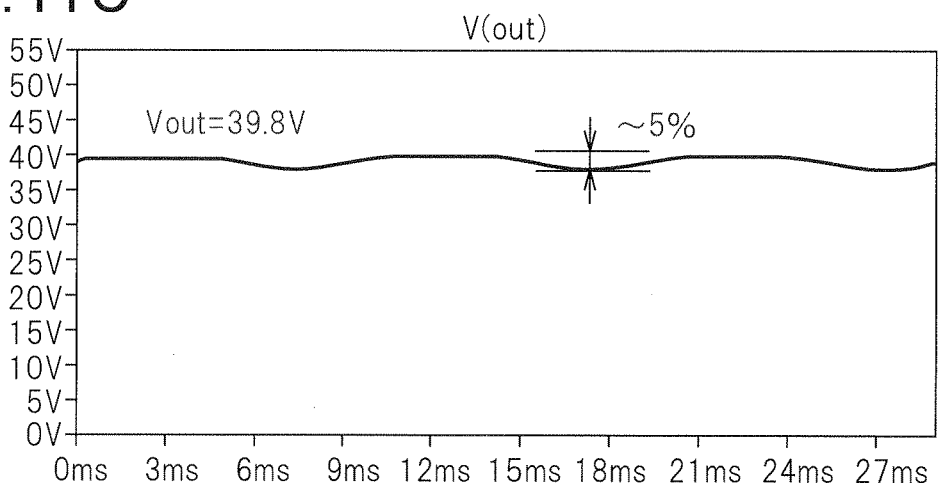

FIG. 11A, FIG. 11B, and FIG. 11C are diagrams for explaining the operation of the switching power supply apparatus of FIG. 6 and illustrate the simulation results obtained by sinusoidally varying the threshold voltage Vth between +5 V and −5 V. FIG. 11A illustrates the variation of the threshold voltage Vth with time T, FIG. 11B illustrates the variation of the drain-to-source current Ids with time T in that case, and FIG. 11C illustrates the variation of the output voltage Vout with time T.

As illustrated in FIG. 11A to FIG. 11C, when the threshold voltage Vth changes as depicted in FIG. 11A, the drain-to-source current Ids changes as depicted in FIG. 11B and the output voltage Vout changes as depicted in FIG. 11C.

That is, whether the threshold voltage Vth of the switching device changes in the positive direction or negative direction, a control pulse of substantially constant voltage amplitude is supplied to the switching device as depicted in FIG. 11B, and thus the output voltage Vout is maintained at the desired voltage (about 40 V).

More specifically, as may be seen from FIG. 11C, when the output voltage is 39.8 V, for example, even if the threshold voltage Vth changes as depicted in FIG. 11A, it is possible to hold the variation of the output voltage Vout to within about 5%.

This means that the power associated with the switching device is small, making it possible, for example, to further enhance the efficiency of the switching power supply apparatus.

Figure 12:
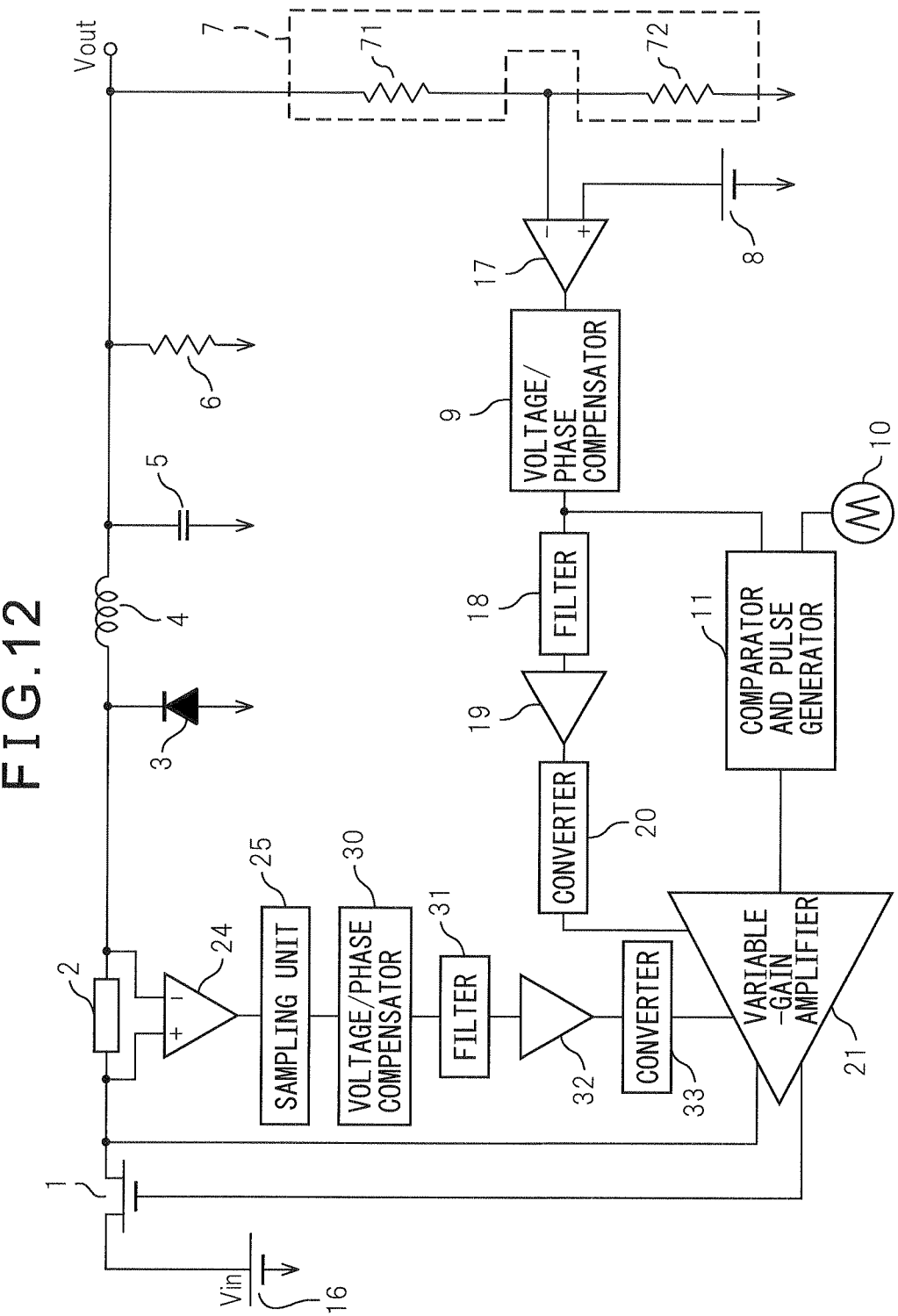
FIG. 12 is a block diagram illustrating a modified example of the switching power supply apparatus of FIG. 5.

FIG. 12 is a block diagram illustrating a modified example of the switching power supply apparatus of FIG. 5. As is apparent from a comparison between FIG. 12 and FIG. 5, the second control signal generating unit in this modified example is identical in configuration to the first control signal generating unit.

That is, the second control signal generating unit for adjusting the offset voltage for the control pulse to be supplied to the gate of the switching transistor 1 includes a filter 31, a buffer amplifier 32, and a converter 33.

In the modified example, as in the embodiment of FIG. 5, the first control signal generating unit for adjusting the amplitude of the control pulse to be supplied to the gate of the switching transistor 1 includes the filter 18, the buffer amplifier 19, and the converter 20.

More specifically, the output of the sampling unit 25 is supplied to a voltage/phase compensator 30 which adjusts the speed of the temporal change of the current, and the output of the voltage/phase compensator 30 is supplied to the filter 31 where high-frequency components are eliminated from that output.

It will be appreciated that the voltage/phase compensator 30 may be variously modified, as in the case of the previously described voltage/phase compensator 9, and is not limited to the one inserted between the sampling unit 25 and the filter 31.

The output of the filter 31 is supplied to the buffer amplifier 32, and the output of the buffer amplifier 32 is supplied to the variable-gain amplifier 21 via the converter 33 for converting that output into any suitable output (prescribed level).

More specifically, the converter 33 supplies the output of the buffer amplifier 32 to the variable-gain amplifier 21 after converting it, for example, into an output such that the DC component flowing through the switching transistor 1 becomes zero. This makes it possible to set the DC gate voltage of the switching transistor 1 properly, for example, even when the threshold voltage of the switching transistor 1 is shifted in the positive direction.

In the second control signal generating unit of the modified example, after the voltage and phase of the signal output from the sampling unit 25 has been compensated by the voltage/phase compensator 30, the output is passed through the filter 31 and amplified by the buffer amplifier 32 whose output is then converted by the converter 33 into a prescribed signal (second control signal) for output.

Here, the output signal from the converter 33 is applied, for example, to the terminal 212 in FIG. 7 to control the resistance value of the variable resistor R4 and thereby adjust the DC voltage level applied to the variable-gain amplifier 21. In this way, the offset voltage for the control pulse to be supplied to the gate of the switching transistor 1 is adjusted.

On the other hand, the output signal from the converter 20 is applied, for example, to the terminal 214 in FIG. 7 to control the resistance value of the variable resistor R3 and thereby adjust the amplitude of the output signal of the comparator and pulse generator 11. In this way, the amplitude of the control pulse to be supplied to the gate of the switching transistor 1 is adjusted.

While the above embodiment and modified example have been described as including both the first control signal generating unit and the second first control signal generating unit, it is possible to achieve the effect of reducing the power loss associated with the switching transistor 1 if one or the other of them is omitted.

That is, by just adjusting either the offset voltage or the amplitude of the control pulse to be supplied to the gate of the switching transistor 1, it is possible to achieve a reduction in power loss. In other words, if one or the other of the first control signal generating unit and the second first control signal generating unit is omitted from the switching device compensation circuit, it is possible to reduce the power loss associated with the switching device.

Figure 13:
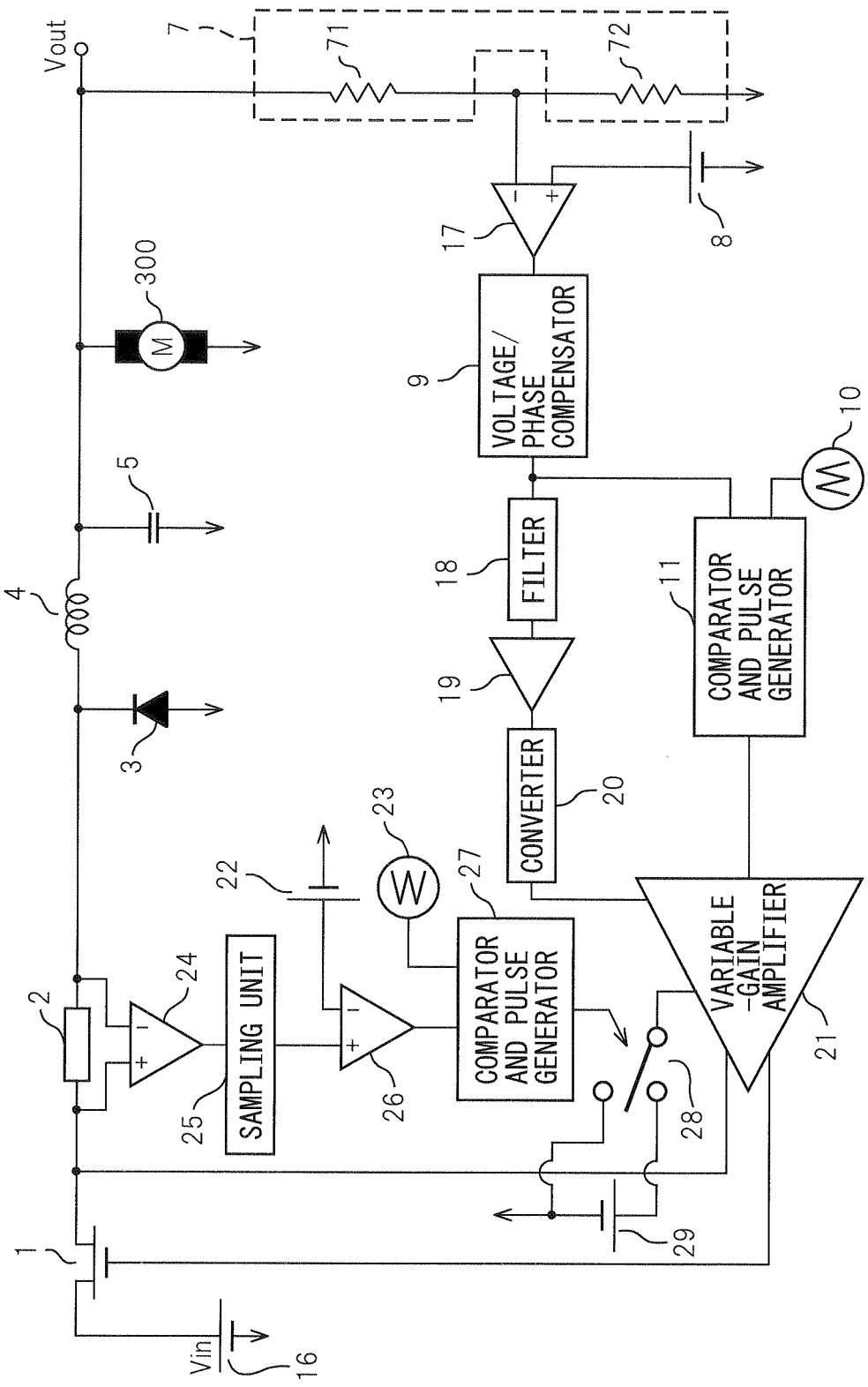
FIG. 13 is a block diagram illustrating one example of a motor apparatus to which the switching power supply apparatus of FIG. 5 is applied.

FIG. 13 is a block diagram illustrating one example of a motor apparatus to which the switching power supply apparatus of FIG. 5 is applied; here, a DC motor 300 is provided as the load resistor 6 and the DC motor 300 is driven by the output voltage of the switching power supply apparatus.

As illustrated in FIG. 13, the switching device compensation circuit described above is also applicable, for example, to the motor apparatus that drives the DC motor 300. Furthermore, the switching device compensation circuit of each of the embodiments described herein is widely applicable as a switching device compensation circuit or the like for use in a known motor inverter capable of varying the number of revolutions or the rotational torque of an AC motor (for example, a three-phase motor) as desired.

Furthermore, as previously described, the switching device compensation circuit of each of the embodiments described herein is widely applicable to various switching devices including compound semiconductor transistors such as GaN HEMTs and field-effect transistors such as MOSFETs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A switching device compensation circuit, which performs switching control by applying a control pulse to a control terminal of a switching device, the switching device compensation circuit comprising:
   a first threshold voltage change detection unit configured to detect a change in threshold voltage of the switching device from an output voltage controlled via the switching device;
   a first control signal generating unit configured to generate a first control signal in accordance with an output of the first threshold voltage change detection unit; and
   an amplitude control unit including a variable-gain amplifier configured to control an amplitude of the control pulse to be applied to the control terminal of the switching device in accordance with the first control signal output from the first control signal generating unit.

2. The switching device compensation circuit as claimed in claim 1, wherein
   the first control signal generating unit includes:
      a first filter configured to filter the output of the first threshold voltage change detection unit;
      a first buffer amplifier configured to buffer and amplifies an output of the first filter; and
      a first converter configured to output the first control signal by converting an output of the first buffer amplifier, and wherein
   a gain in the variable-gain amplifier is adjusted by the first control signal supplied from the first converter.

3. A switching device compensation circuit, which performs switching control by applying a control pulse to a control terminal of a switching device, the device compensation circuit comprising:
   a first threshold voltage change detection unit configured to detect a change in threshold voltage of the switching device from an output voltage controlled via the switching device;
   a first control signal generating unit configured to generate a first control signal in accordance with an output of the first threshold voltage change detection unit; and
   an amplitude control unit configured to control the amplitude of the control pulse in accordance with an output of the first control signal generating unit, wherein
   the first threshold voltage change detection unit includes a first error amplifier configured to compare a voltage obtained by dividing the output voltage with a voltage supplied from a first reference power supply.

4. A switching device compensation circuit, which performs switching control by applying a control pulse to a control terminal of a switching device, the switching device compensation circuit comprising:

a second threshold voltage change detection unit configured to detect a change in threshold voltage of the switching device from a current flowing through the switching device;

a second control signal generating unit configured to generate a second control signal in accordance with an output of the second threshold voltage change detection unit; and an offset voltage control unit including a variable-gain amplifier configured to control an offset voltage for the control pulse to be applied to the control terminal of the switching device in accordance with the second control signal output from the second control signal generating unit.

5. The switching device compensation circuit as claimed in claim 4, wherein the second control signal generating unit includes:

a second error amplifier configured to compare a voltage output from the second threshold voltage change detection unit with a voltage supplied from a second reference power supply; and a second comparator and pulse generator configured to output the second control signal of a prescribed pulse in accordance with an output of the second error amplifier, and wherein a DC voltage level to be applied to the variable-gain amplifier is adjusted by the second control signal supplied from the second comparator and pulse generator.

6. The switching device compensation circuit as claimed in claim 5, wherein the offset voltage control unit further includes a switch whose switching is controlled by the second control signal supplied from the second comparator and pulse generator, and which applies a DC voltage of a different level to the variable-gain amplifier.

7. The switching device compensation circuit as claimed in claim 4, wherein the second control signal generating unit includes:

a second filter configured to filter the output of the second threshold voltage change detection unit;

a second buffer amplifier configured to buffer and amplifies an output of the second filter; and a second converter configured to output the second control signal by converting an output of the second buffer amplifier, and wherein the DC voltage level in the variable-gain amplifier is adjusted by the second control signal supplied from the second converter.

8. A switching device compensation circuit, which performs switching control by applying a control pulse to a control terminal of a switching device, the switching device compensation circuit comprising:

a second threshold voltage change detection unit configured to detect a change in threshold voltage of the switching device from a current flowing through the switching device;

a second control signal generating unit configured to generate a second control signal in accordance with an output of the second threshold voltage change detection unit; and an offset voltage control unit configured to control an offset voltage for the control pulse in accordance with an output of the second control signal generating unit, wherein the second threshold voltage change detection unit includes:

an impedance device coupled in series to the switching device;

a detector configured to detect a voltage developed across the impedance device; and a sampling unit configured to sample an output signal of the detector and to hold and outputs a valley voltage detected from the output signal of the detector.

9. The switching device compensation circuit as claimed in claim 8, wherein the sampling unit includes a sampling circuit comprising:

an AC component extracting unit configured to extract an amplitude component of an AC signal from an input signal;

a first adder configured to subtract an output of the AC component extracting unit from the input signal;

an averaging unit configured to average an output of the first adder;

a rectifying unit configured to rectify the output of the AC component extracting unit;

a smoothing unit configured to smooth an output of the rectifying unit; and a second adder configured to subtract an output of the smoothing unit from an output of the averaging unit and outputs a bottom-hold value.

\* \* \* \* \*